(12) United States Patent
Serobian et al.

(10) Patent No.: US 8,974,589 B2
(45) Date of Patent: Mar. 10, 2015

(54) SILICONE PROTECTANT COMPOSITIONS

(75) Inventors: Ashot K. Serobian, Martinez, CA (US); Bhaskar Ramachandran, San Ramon, CA (US)

(73) Assignee: The Armor All/STP Products Company, Danbury, CT (US)

( * ) Notice: Subject to any disclaimer, the term of this patent is extended or adjusted under 35 U.S.C. 154(b) by 307 days.

(21) Appl. No.: 12/911,486

(22) Filed: Oct. 25, 2010

(65) Prior Publication Data

US 2012/0097070 A1    Apr. 26, 2012

(51) Int. Cl.
*C09D 1/00* (2006.01)
*C09G 1/16* (2006.01)
*C09D 183/04* (2006.01)
*C08G 77/04* (2006.01)

(52) U.S. Cl.
CPC ............... *C09G 1/16* (2013.01); *C09D 183/04* (2013.01); *C08G 77/045* (2013.01)
USPC .................................................. 106/287.1

(58) Field of Classification Search
CPC ....... C08G 77/045; C09D 183/16; C09D 1/16
USPC ...................................................... 106/287.1
IPC ....................................................... C09D 1/00
See application file for complete search history.

(56) References Cited

U.S. PATENT DOCUMENTS

| | | | |
|---|---|---|---|
| 3,929,678 A | 12/1975 | Laughlin et al. | |
| 4,259,217 A | 3/1981 | Murphy | |
| 5,017,221 A | 5/1991 | Legrow et al. | |
| 5,342,436 A | 8/1994 | Thrasher | |
| 5,362,488 A * | 11/1994 | Sibley et al. ............... | 424/78.05 |
| 5,433,890 A | 7/1995 | Meyer et al. | |
| 5,507,969 A | 4/1996 | Shinohara et al. | |
| 5,545,683 A | 8/1996 | Okamura et al. | |
| 5,661,208 A | 8/1997 | Estes | |
| 5,693,704 A | 12/1997 | Estes | |
| 5,759,980 A | 6/1998 | Russo et al. | |
| 5,811,487 A | 9/1998 | Schulz, Jr. et al. | |
| 5,844,007 A | 12/1998 | Kijima | |
| 5,908,891 A | 6/1999 | Fey et al. | |
| 5,913,969 A | 6/1999 | Howe | |
| 5,968,238 A | 10/1999 | Healy et al. | |
| 5,985,994 A | 11/1999 | Oberneder et al. | |
| 5,989,640 A * | 11/1999 | Kijima et al. ................. | 427/387 |
| 6,013,323 A | 1/2000 | Klayder et al. | |
| 6,206,956 B1 | 3/2001 | Muntz et al. | |
| 6,221,433 B1 * | 4/2001 | Muntz et al. ................. | 427/387 |
| 6,221,833 B1 | 4/2001 | Colurciello, Jr. | |
| 6,652,632 B2 | 11/2003 | Moodycliffe et al. | |
| 6,749,673 B2 | 6/2004 | Moodycliffe et al. | |
| 6,907,767 B2 | 6/2005 | Seung | |
| 6,949,271 B2 | 9/2005 | Shannon et al. | |
| 7,001,463 B2 | 2/2006 | Jones | |
| 7,074,262 B2 | 7/2006 | Huang et al. | |
| 7,256,232 B2 | 8/2007 | Lamaze et al. | |
| 7,297,328 B2 | 11/2007 | Loffler et al. | |
| 7,318,871 B2 | 1/2008 | Egan et al. | |
| 7,368,147 B2 | 5/2008 | Bell | |
| 7,645,333 B2 * | 1/2010 | Serobian ..................... | 106/287.1 |
| 2002/0161105 A1 | 10/2002 | Rodgers et al. | |
| 2004/0131786 A1 | 7/2004 | Ma et al. | |
| 2005/0158268 A1 * | 7/2005 | Schmucker-Castner et al. ........................... | 424/70.16 |
| 2005/0250668 A1 | 11/2005 | Serobian et al. | |
| 2007/0129275 A1 | 6/2007 | Hasinovic et al. | |
| 2007/0275867 A1 | 11/2007 | Serobian | |
| 2008/0023031 A1 | 1/2008 | Kellar et al. | |
| 2008/0241371 A1 | 10/2008 | Havelka et al. | |
| 2008/0248323 A1 | 10/2008 | Radomyselski et al. | |
| 2009/0088519 A1 * | 4/2009 | O'Brien Stickney et al. | 524/556 |
| 2009/0088525 A1 | 4/2009 | Jaynes et al. | |
| 2010/0305260 A1 | 12/2010 | Serobian et al. | |

FOREIGN PATENT DOCUMENTS

| | | |
|---|---|---|
| CA | 1176828 | 10/1984 |
| CA | 2198813 | 8/1998 |
| EP | 0 839 876 | 5/1998 |

OTHER PUBLICATIONS

International Search Report of PCT Application No. PCT/US2010/033027, Jun. 3, 2010, 3 pages.
Written Opinion of PCT Application No. PCT/US2010/033027, Jun. 3, 2010, 6 pages.
International Search Report and Written Opinion dated May 8, 2012 from PCT/US2011/056983.
International Preliminary Report on Patentability dated Dec. 14, 2012 from PCT/us2011/056983, 7 pages.
Canadian Patent Office action dated Sep. 11, 2013 from corresponding Canadian Patent Application No. 2,807,822, pp. 3.
Australian Patent Office action dated Sep. 27, 2013 from corresponding Canadian Patent Application No. 2011323862, pp. 4.

* cited by examiner

*Primary Examiner* — Jun Li
(74) *Attorney, Agent, or Firm* — Ohlandt, Greeley, Ruggiero & Perle, L.L.P.

(57) ABSTRACT

The present invention relates generally to compositions and methods of use for an automotive protectant composition and/or automotive cleaning composition. The protectant composition and/or cleaning composition includes silicone, organic solvent, rheology modifier and water. The composition also optionally includes other components. The weight ratio of the silicon to the organic solvent is at least 0.5:1 and generally no more than 3:1. The organic solvent generally is or includes mineral oil.

15 Claims, No Drawings

US 8,974,589 B2

SILICONE PROTECTANT COMPOSITIONS

FIELD OF THE INVENTION

The present invention relates generally to protectant compositions and methods of use for protectant compositions, more particularly to compositions and methods of use for a silicone based protectant composition, and even more particularly to compositions and methods of use for a silicone based protectant composition used as an automotive protectant that exhibits beneficial cleaning and shine characteristics.

BACKGROUND OF THE INVENTION

Silicone-based automotive protectants commonly available in the marketplace. The term "automotive protectants" is defined herein as products which are applied to vinyl, leather, plastics, rubber, and other interior and exterior surfaces of automobiles, trucks, and other vehicles to improve the gloss of such surfaces. The protectants also can be formulated to protect such surfaces from the damaging effects of UV rays, sunlight, heat, moisture, etc. Although described as "automotive protectants", the term "automotive" is not meant as a restriction on the use of silicone-based protectants, which protectants may be equally useful on boats, trains, planes, outdoor furniture, indoor furniture etc., and also for a variety of interior and exterior uses.

Automotive protectants are generally applied to a surface to be "protected" (e.g., tires, rubber car mats, car seat, dashboard, arm rest, etc.). The protectant may be poured or sprayed directly onto the surface to be treated, and/or may be initially sprayed onto a cloth, pad, sponge, etc. The protectants generally enhance the shine or gloss of the substrate surface. The organopolysiloxane coating on the substrate can also protect the substrate surface from heat damage and/or fading to sun exposure. The protectants can also include UV protectors.

The active ingredient of automotive protectants is the silicone. Silicone is also one of the more expensive components of the automotive protectant. The silicone content of some automotive protectants can be as high as 40-50 weight percent. The high content of silicone is typically used to obtain the desired amount of shine and gloss on a substrate surface.

Two patents, U.S. Pat. Nos. 6,221,433 and 6,206,956, by Muntz et al., describe siloxane automotive protectant compositions which contain about 10% to 20% by weight of organopolysiloxane and having comparable or improved gloss performance to comparative examples with 20% to 40% by weight of organopolysiloxane. Although these protectant formulations are an improvement over the previous protectants, there is still an opportunity to lower the amount of siloxane in the formulation to levels of less than 10% to achieve a cost savings while maintaining good gloss performance.

Accordingly, there is a need in the art for improved protectant compositions and methods of using said protectants which will provide good shine and gloss, and also provide protection to various types of automotive surfaces with lower amounts of silicone than which have been used in prior art protectant compositions.

SUMMARY OF THE INVENTION

The present invention relates to protectant compositions and methods of use for protectant compositions such as, but not limited to, automotive protectants, that exhibits beneficial cleaning and shine characteristics. The protectant composition is formulated to provide uniform gloss and protection to substrate surfaces. The protectant composition is formulated to contain a lower silicone content than many prior art protectants, but yet provides comparable or higher gloss as compared to other prior art and/or commercial formulations. The protectant composition can be formulated to be a sprayable composition; however, it can be appreciated that the protectant composition can be applied to a substrate surface in other or additional ways (e.g., pour protectant composition directly onto substrate surface; apply protectant composition to a cloth, pad, sponge, etc. and then use such cloth, pad, sponge, etc. on substrate surface; pre-load protectant composition on a wipe and use pre-loaded wipe on substrate surface; etc.). The protectant composition can be in the form of a paste or liquid. When the protectant composition is a liquid and is to be sprayable, the protectant composition can be dispensed in a liquid or an aerosol sprayer. The protectant composition is formulated to provide a desired gloss and/or shine surface to a substrate surface. The protectant composition can also be formulated so as to clean a soiled substrate surface; however, this is not required. The protectant composition of the present invention is also formulated to have lower quantities of silicone without sacrificing the desired gloss and shine formed on a substrate surface.

In accordance with one non-limiting aspect of the present invention which pertains to protectant composition that includes a novel amount and ratio of silicone and organic solvent (e.g., mineral oil, natural oil, etc), and which can be used to enhance gloss and aids in protecting various types of substrate surfaces such as, but not limited to, automotive surfaces. It has been surprisingly found that by carefully controlling the ratio of silicone to organic solvent in the protectant composition, the amount of silicone in the protectant composition can be significantly reduced while still creating a shine and gloss on a substrate surface that heretofore was only possible with much larger concentrations of silicone. Generally, the organic solvent includes mineral oil, natural oil, and any mixtures of combinations thereof. As defined herein, natural oils are organic oils that are produced by plants, animals, and other organisms through organic processes. Natural oils include but are not limited to, vegetable oils, essential oils, tallow, and other lipids. Suitable vegetable oils, include but are not limited to, coconut oil, corn oil, cottonseed oil, olive oil, palm oil, peanut oil, rapeseed oil, including canola oil, safflower oil, sesame oil, soybean oil, sunflower oil, and other suitable vegetable, grain and nut oils. As defined in herein, mineral oil is oil composed mainly of cyclic paraffins and/or alkanes, wherein the cyclic paraffins and/or alkanes are formed of carbon chains having 10-50 carbons. The mineral oil is generally transparent and colorless. Common mineral oils are of three basic types, namely 1) paraffinic oils that are based on n-alkanes, 2) naphthenic oils that are based on cycloalkanes, and 3) aromatic oils that are based on aromatic hydrocarbons. Mineral oils can include natural ester oils, fish oils, various hydrocarbon-based saturated or unsaturated compounds, etc. Common names for mineral oil include Adepsine oil, Albolene, Cable oil, Baby Oil, Drakeol, Electrical Insulating Oil, Heat-treating oil, Hydraulic oil, Lignite oil, Liquid paraffin, Mineral Seal Oil, Nujol, Paraffin oil, Petroleum liquid, Technical oil, and White oil. Generally, the organic solvent includes at least about 60 weight percent mineral oil, typically at least about 75 weight percent mineral oil, more typically about 75-100 weight percent mineral oil, still more typically about 80-100 weight percent organic solvent, and yet more typically about 90-100 weight percent mineral oil. In one non-limiting embodiment of the present invention, the weight percent ratio of silicone to organic solvent is about 0.5-3:1. It has been found that when the weight percent ratio of silicone to organic solvent is less than 0.5:1, the protectant composition does not produce a desired gloss or shine on a substrate surface. When the weight percent ratio of silicone to organic solvent is greater than 3:1, the protectant composition produces too much of a gloss or shine on a substrate surface which is unacceptable to consumers. In one non-limiting aspect of this embodiment, the weight percent ratio of silicone to organic solvent in the protectant composition of the present invention is about 0.5-2.5:1. In another non-limiting aspect of this embodiment, the weight percent ratio of silicone to organic solvent in the protectant composition of the present invention is about 0.5-2:1. In still another non-limiting aspect of this embodiment, the weight percent ratio of silicone to organic solvent in the protectant composition of the present invention is about 0.75-2:1. In yet another non-limiting aspect of this embodiment, the weight percent ratio of silicone to organic solvent in the protectant composition of the present invention is about 0.75-1.75:1. In still yet another non-limiting aspect of this embodiment, the weight percent ratio of silicone to organic solvent in the protectant composition of the present invention is about 0.75-1.5:1. In a further non-limiting aspect of this embodiment, the weight percent ratio of silicone to organic solvent in the protectant composition of the present invention is about 0.75-1.25:1. In still a further non-limiting aspect of this embodiment, the weight percent ratio of silicone to organic solvent in the protectant composition of the present invention is about 1-1.25:1. In yet a further non-limiting aspect of this embodiment, the weight percent ratio of silicone to organic solvent in the protectant composition of the present invention is about 1:1.

In accordance with another non-limiting aspect of the present invention, the protectant composition includes a silicone content that is less than the silicone content of comparable prior art products. Due to the novel silicone to organic solvent weight percent ratio in the protectant composition of the present invention, the silicone content can be maintained at lower levels than similar functioning prior art products and still maintain the same or superior performance to such prior art products. In one non-limiting embodiment of the invention, the silicone content of the protectant composition of the present invention is at least about 0.5 weight percent and less than about 20 weight percent. The ability to reduce the silicone content of the protectant composition below about 20 weight percent significantly reduces the raw material costs of the protectant composition without sacrificing the performance of the protectant composition. In one non-limiting aspect of this embodiment, the silicone content of the protectant composition of the present invention is about 0.5-15 weight percent. In another non-limiting aspect of this embodiment, the silicone content of the protectant composition of the present invention is about 1-12 weight percent. In still another non-limiting aspect of this embodiment, the silicone content of the protectant composition of the present invention is about 1-11 weight percent. In yet another non-limiting aspect of this embodiment, the silicone content of the protectant composition of the present invention is less than about 10 weight percent. In still yet another non-limiting aspect of this embodiment, the silicone content of the protectant composition of the present invention is about 1.5-9.9 weight percent. In a further non-limiting aspect of this embodiment, the silicone content of the protectant composition of the present invention is about 2-9.5 weight percent. In still a further non-limiting aspect of this embodiment, the silicone content of the protectant composition of the present invention is about 2-9 weight percent. In yet a further non-limiting aspect of this embodiment, the silicone content of the protectant composition of the present invention is about 3-7 weight percent.

In accordance with still another non-limiting aspect of the present invention, the protectant composition includes one or more additional components other than silicone and organic solvent to modify and/or enhance the properties of the protectant composition. The one or more additional components include, but are not limited to, water, surfactant, emulsifier, rheology modifier, thickener, preservative, pH adjuster, opacifier or colorant and/or fragrance.

One non-limiting object of the present invention is the provision of a protectant composition that has a lower silicone content than many prior art protectants.

Another and/or alternative non-limiting object of the present invention is the provision of a protectant composition that creates a gloss and/or shine that is similar to or superior to many prior art protectants.

Still another and/or alternative non-limiting object of the present invention is the provision of a protectant composition that can clean and shine a substrate surface.

Yet another and/or alternative non-limiting object of the present invention is the provision of a protectant composition that is shelf stable.

Still yet another and/or alternative non-limiting object of the present invention is the provision of a protectant composition that is sprayable.

A further and/or alternative non-limiting object of the present invention is the provision of a protectant composition that includes a novel weight percent ratio of silicone to organic solvent.

Still a further and/or alternative non-limiting object of the present invention is the provision of a protectant composition that cleans and shines a substrate surface such as tires and various automotive surfaces.

Yet a further and/or alternative non-limiting object of the present invention is the provision of a protectant composition that includes a novel weight percent ratio of silicone to organic solvent in combination with a rheology modifier to form a shelf stable, sprayable composition that can clean and shine various types of substrate surfaces.

Still yet a further and/or alternative non-limiting object of the present invention is the provision of a protectant composition that includes a novel weight percent ratio of silicone to organic solvent and has a lower silicone content than many prior protectants, and which maintains the shine and gloss performance as compared with prior art protectants.

These and other advantages will become apparent to those skilled in the art upon the reading and following of this description.

DETAILED DESCRIPTION OF INVENTION

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes one or more such surfactant.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, exemplary materials and methods are described herein.

In the present invention, effective amounts are generally those amounts listed as the ranges or levels of ingredients in the descriptions, which follow hereto. Unless otherwise stated, all value amounts, whether or not listed in percentage ("%'s"), are to be considered in weight percent of the total composition unless indicated otherwise. Compositions are generally expressed in weight percent equivalent to 100% active material (active weight basis) unless stated otherwise, thus carrier or solvent weight is not included in the expressed percentage unless indicated otherwise.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

The term "silicone" includes organopolysiloxane fluid. Organopolysiloxane fluids are commonly referred to as "silicone oils" or "silicones" and are distinguished from silicone elastomers and resins, which are more thoroughly cross-linked than silicone oils. The silicone used in the protectant composition generally has a neat viscosity of about 1 cSt to about 1,000,000 cSt (25° C.) (ASTM D-4283), typically about 10 cSt to about 100,000 cSt, more typically about 50 cSt to about 50,000 cSt, still more typically about 100 cSt to about 25,000 cSt, yet still more typically about 150 cSt to about 10,000 cSt, even more typically about 150 cSt to about 5,000 cSt, still even more typically about 150 cSt to about 2,000 cSt, and still yet even more typically about 150 cSt to about 1,000 cSt. The silicone component of the protectant composition may contain a mixture of both low and high viscosity silicones; however, this is not required. Mixtures of various silicones can be used, including mixtures of silicones of differing viscosities. The silicones used in the protectant composition can have a small particle size (e.g., 10 nm to 2000 nm); however, this is not required.

Suitable silicones that can be used in the protectant composition include those based on organopolysiloxane, these being selected from the class of polymers having the general formula $(R_n SiO_{((4-n)/2)})_m$, wherein n is between 0 and 3 and m is 2 or greater, and R is alkyl or aryl, as defined in *Silicone Compounds Register and Review*, 5th Edition, R. Anderson, G. L. Larson and C. Smith Eds., Huls America Inc., Piscataway, N.J., p 247 (1991), which is fully incorporated herein by reference. The value of m may be as large as one million or more, but more commonly has a value of between about 5 and 1000, these being readily flowable liquids with good handling properties and performance characteristics. These silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialkylsiloxane); alkyl end-blocked polydialkylsiloxane; polyoxy(dialkylsilylene), alpha-(trialkylsilyl)-omega-hydroxy; poly[oxy(dialkylsilylene)], alpha-[trialkylsilyl]-omega-[(trialkylsilyl)oxy]; and alpha-(trialkylsilyl)poly[oxy(dialkylsilylene)]-omega-alky. Some additional suitable examples also include dimethicone copolyol, dimethylpolysiloxane, diethylpolysiloxane, high molecular weight dimethicone, mixed C1-C30 alkyl polysiloxane, phenyl dimethicone, dimethiconol, and mixtures thereof. Non-limiting examples of silicones useful herein are also described in U.S. Pat. No. 5,011,681, which are fully incorporated herein by reference. The silicone compounds that can also or alternatively be used in the protectant composition of the present invention include polyalkyl and/or polyaryl siloxanes. The alkyl or aryl groups substituted on the siloxane chain (R) or at the ends of the siloxane chains can have any structure as long as the resulting silicone remains fluid at or around room temperature (70° F.). Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof. Suitable silicone compounds that can also or alternatively be used in the protectant composition of the present invention are polydimethylsiloxane, polydiethylsiloxane, and polymethylphenylsiloxane. Polydimethylsiloxane, which is also known as dimethicone, is readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Dow Corning 200, 300 and 350 series. Polyalkylaryl siloxane fluids containing one or more alkyl or alkylaryl substitutes can also be used, for example, and include, but are not limited to polymethylphenylsiloxanes, poly[(dimethylsiloxane)/(methylvinylsiloxane)], poly[(dimethylsiloxane)/(diphenylsiloxane)], poly[(dimethylsiloxane)/(phenylmethylsiloxane)], and poly[(dimethylsiloxane)/(diphenylsiloxane)/(methylvinylsiloxane)]. These siloxanes are available, for example, from the General Electric Company as SF 1075 methyl phenyl fluid or from Dow Corning as 556 Cosmetic Grade Fluid, Rhodorsil 763 from Rhone-Poulenc, Silbione 70641 V 30 and 70641 V 200 from Rhone-Poulenc, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023. Higher molecular weight silicones, including silicone gums and resins, may be used in accordance with the present invention and include polydiorganosiloxanes with a molecular mass of between 200,000 and 5,000,000, used alone or as a mixture in a solvent chosen from volatile silicones, polydimethylsiloxane (PDMS) oils, polyphenylmethylsiloxane (PPMS) oils, isoparaffins, methylene chloride, pentane, dodecane, tridecane and tetradecane, or mixtures thereof. The silicones can be linear or branched, and can be modified by chemical groups to provide additional properties. For example, suitable silicones also include the amino modified silicones, wherein R is an amine, amide or alkyl, dialkyl or trialkyl derivatized amine constituent. By substitution of one or more of the R groups with other organic or functionalized organic groups, such as vinyl, phenyl, fluoroalkyl, perfluoroalkane, carboxylic acid derivatives, carboxyester and quaternary ammonium derivatives, other organopolysiloxane can be produced. Included are mixtures of these materials, for example, but not limited to: 1) mixtures formed from a polydimethylsiloxane hydroxylated at the end of the chain (Dimethiconol according to the CTFA nomenclature) and from a cyclic polydimethylsiloxane (Cyclomethicone according to the CTFA nomenclature), such as the product Q2 1401 sold by the company Dow Corning; 2) mixtures formed from a polydimethylsiloxane gum with a cyclic silicone, such as the product SF 1214 Silicone Fluid from General Electric, which is an SE 30 gum of MW 500,000 dissolved in SF 1202 Silicone Fluid (decamethylcyclopentasiloxane); 3) mixtures of two PDMS materials of different viscosities, for example a PDMS gum and a PDMS oil, such as the products SF 1236 and CF 1241 from the company General Electric. The product "SF 1236" is a mixture of an SE 30 gum defined above, with a viscosity of 20 m²/s, and of an SF 96 oil with a viscosity of $5 \times 10^{-5}$ m²/s (15% SE 30 gum and 85% SF 96 oil). The product "CF 1241" is a mixture of an SE 30 gum (33%) and of a PDMS (67%) with a viscosity of $10^{-3}$ m²/s. The organo-modified silicones in accordance with the present invention are silicones as defined above, containing in their general structure one or more organo-functional groups directly attached to the siloxane chain or attached via a hydrocarbon-based radical. Non-limiting examples include silicones containing: a) polyethyleneoxy and/or polypropyleneoxy groups, optionally containing alkyl groups, such as: the product known as dimethicone copolyol sold by the company Dow Corning under the name "DC 1248", and alkyl (C12) methicone copolyol sold by the company Dow Corning under the name "Q2 5200", the oils "Silwet" L 722, L 7500, L 77 and L 711 from the company General Electric, the mixture of dimethicone copolyol and of cyclomethicone, such as the product sold under the name "Q2-3225C" by the company Dow Corning; the product "Mirasil DMCO" sold by Rhone-Poulenc; b) (per)fluoro groups, for instance trifluoroalkyl groups, such as, for example, those sold by the company General Electric under the names "FF 150 Fluorosilicone Fluid" or by the company Shin Etsu under the names "X-22-819", "X-22-820", "X-22-821", "X-22-822" or "FL 100"; c) hydroxyacylamino groups, such as those described in European patent application EP-A-0,342,834, and in particular the silicone sold by the company Dow Corning under the name "Q2-8413"; d) thiol groups, such as in the silicones "X 2-8360" from Dow Corning or "GP 72A" and "GP 71" from Genesee; Union Carbide or the silicone known as "Amodimethicone" in the CTFA dictionary; f) carboxylate groups, such as the products described in European patent EP 186,507 from Chisso Corporation, which is hereby incorporated by reference; g) hydroxylated groups, such as the polyorganosiloxanes containing a hydroxyalkyl function, described in patent application FR-A-2,589,476, which is hereby incorporated by reference, and in particular polyorganosiloxanes containing a .gamma.-hydroxy-propyl function; h) alkoxylated groups containing at least 12 carbon atoms, such as the product "Silicone Copolymer F 7551" from SWS Silicones and the products "Abilwax 2428", "Abilwax 2434" and "Abilwax 2440" from the company Goldschmidt; i) acyloxyalkyl groups containing at least 12 carbon atoms, such as, for example, the poly-organosiloxanes described in patent application FR-A-2,641,185, which is hereby incorporated by reference, and in particular polyorganosiloxanes containing a stearoyloxypropyl function; j) quaternary ammonium groups, such as in the products "X2 81 08" and "X2 81 09" and the product "Abil K 3270" from the company Goldschmidt; k) amphoteric or betaine groups, such as in the product sold by the company Goldschmidt under the name "Abil B 9950"; and/or 1) bisulphite groups, such as in the products sold by the company Goldschmidt under the names "Abil S 201" and "Abil S 255". The block copolymers having a polysiloxane-polyoxyalkylene linear block as repeating unit, which are used in the context of the present invention, include those that have the following general formula: ([Y (R$_2$SiO)aR'$_2$SiYO][C$_n$H$_{2n}$O)$_b$]$_c$ in which R and R', which may be identical or different, represent a monovalent hydrocarbon-based radical containing no aliphatic unsaturation, n is an integer ranging from 2 to 4, a is an integer greater than or equal to 5, particularly between 5 and 200 and even more particularly between 5 and 100, b is an integer greater than or equal to 4, particularly between 4 and 200 and even more particularly between 5 and 100, c is an integer greater than or equal to 4, particularly between 4 and 1000 and even more particularly between 5 and 300, Y represents a divalent organic group which is linked to the adjacent silicon atom via a carbon-silicon bond and to a polyoxyalkylene block via an oxygen atom, the average molecular weight of each siloxane block is between about 400 and about 10,000, that of each polyoxyalkylene block being between about 300 and about 10,000, the siloxane blocks represent from about 10% to about 95% of the weight of the block copolymer, the average molecular weight of the block copolymer being at least 3000 and particularly between 5000 and 1,000,000 and even more particularly between 10,000 and 200,000. R and R' are suitably chosen from the group comprising alkyl radicals such as, for example, the methyl, ethyl, propyl, butyl, pentyl, hexyl, octyl, decyl and dodecyl radicals, aryl radicals such as, for example, phenyl and naphthyl, arylalkyl radicals such as, for example, benzyl and phenethyl, and tolyl, xylyl and cyclohexyl radicals. Y is suitably selected from radicals including —R"—, —R"—CO—, —R"—NHCO—, —R"—NH—CO—NH—R"—NHCO or —R"—OCONH—R"'—NHCO—, where R" is a divalent alkylene group such as, for example, ethylene, propylene or butylene, and R"' is a divalent alkylene group or a divalent arylene group such as —C$_6$H$_4$—, —C$_6$H$_4$C$_6$H$_4$—, C$_6$H$_4$—CH$_2$—C$_6$H$_4$, C$_6$H$_4$—C(CH$_3$)$_2$C$_6$H$_4$. Even more particularly, Y represents a divalent alkylene radical, more particularly the —CH$_2$—CH$_2$—CH$_2$- radical or the —C$_4$H$_8$— radical. The preparation of the block copolymers used in the context of the present invention is described in European application EP 0,492,657, which is fully incorporated herein by reference.

Volatile silicones can be optionally used. Volatile silicones are silicone oils with sufficient vapor pressure or volatility sufficient to at least partially or completely evaporate into the atmosphere during and/or after application of the inventive compositions onto a surface. When one or more volatile silicones are used in the protectant composition of the present invention, the one or more volatile silicones are generally combined with one or more non-volatile silicones; however, this is not required. The more volatile silicones, when used, are believed to promote leveling of the residual silicone polish film, thus deepening the color of painted surfaces, and to aid in controlling the flowability and/or spreadability of the composition, particularly in embodiments of the invention employing less volatile or non-volatile silicone oils that are designed to be deposited onto the treated surface. Volatile silicone fluids generally are low viscosity silicone fluids with an appreciable vapor pressure at ambient temperatures. Generally, the volatile silicone fluids, when used, have a viscosity of less than about 10 cSt at 25° C. (ASTM D-4283), and optionally less than about 5 cSt at 25° C.

Suitable volatile silicone fluids include the polydimethylcyclosiloxanes. Polydimethylcyclosiloxane fluids useful in the present invention can be defined by the general formula [(CH$_3$)$_2$ SiO]$_x$ wherein x has a value from three to eight. Generally, the polydimethylcyclosiloxane fluid useful in the present invention is a mixture of one or more of the various species represented by the above formula. The commercial polydimethylcyclosiloxanes are mixtures of the various species represented by the above formula and are considered within the scope of the present invention. Some suitable polydimethylcyclosiloxane fluids for use in this invention are those where octamethylcyclotetrasiloxane, decamethylcyclopentasiloxane, and dodecamethylcyclohexasiloxane (i.e., where x is from 4 to 6) predominate. The fluids where decamethylcyclopentasiloxane and dodecamethylcyclohexasiloxane predominate are particularly suited. In accordance with another embodiment, those volatile silicone fluids manufactured by Dow Corning Corporation are used. It is believed that Dow Corning 245 and 345 volatile silicone fluids primarily consist of decamethylcyclopentasiloxane with lesser amounts of dodecamethylcyclohexasiloxane and minor amounts of octamethylcyclotetrasiloxane. Other suitable volatile silicones include "DC 244", "DC 245", "DC 246", "DC 344", "DC 345", and "DC 346" (manufactured by Dow Corning); Silicone 7207 and Silicone 7158 (manufactured by the Union Carbide Corp.); SF 1202 (manufactured by General Electric); and SWS-03314 (manufactured by SWS Silicones, Inc.).

Mixtures and combinations of any of the silicone oil examples herein, for example, silicone oils having different molecular weights, different viscosities, different functionalized derivatives, different volatilities and/or vapor pressures, different properties and benefits, and combinations thereof, may advantageously be combined in the compositions of the present invention. For example, a "lighter" or lower viscosity polyorganosiloxane can be combined with a "heavier" or higher viscosity silicone oil, and/or a silicone gum and/or silicone elastomer for purposes of dispersion in the compositions of the present invention, wherein the "heavier" materials would otherwise be difficult to handle and disperse if used solely or in combination without a "lighter" silicone included. Alternatively, volatile silicone oil may be combined with less volatile or essentially non-volatile silicone oil, depending on the end use application. Alternatively, a silicone oil having spreading, wetting or selective leveling properties may be combined with another silicone oil in order to enhance the spreading and leveling of the combined silicone oil mixture for beneficial effect on the surfaces treated with the inventive compositions described herein.

The use of silicone oils in the protectant composition of the present invention that contains these and other substituted organopolysiloxane, and their combinations and mixtures, is a matter of choice, depending upon the material to be treated and/or the environment to which the treated materials are to be subject, as well as depending upon the desired surface characteristics desired to be imparted to the surface. The silicones may be premixed in their desired proportions prior to processing, or mixed during actual processing of the inventive compositions, or combined into the inventive compositions in any suitable order or fashion, subject solely to considerations of ease of handling, transport, mixing and processing of the inventive compositions.

The silicone in the protectant composition is believed to provide a water and water vapor resistant coating upon the surface of the treated materials to enhance their resistance to environmental stresses, such as water permeation, oxygen permeation and assault by other environmental contaminants.

The silicone in the protectant composition is useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the silicone is useful for its restorative effect when used on aged and worn surfaces, particularly elastomeric surfaces that suffer most from these conditions.

The silicone in the protective composition is also believed to provide a soil, oil, dirt and grime resistant coating upon the surface of the treated materials, such as for example, household surfaces including, but not limited to stainless steel, tile, porcelain, marble and the like, to enhance their resistance to staining and soiling, water and microbial growth. In one non-limiting embodiment of the present invention, the silicone used in the protectant composition includes one or more of a silicone selected from polydimethylsiloxane (PDMS), polydiethylsiloxane, polymethylphenylsiloxane, polyalkylarylsiloxane, polyethyleneoxydialkylsiloxane, polypropyleneoxydialkylsiloxane and polydialkylcyclosiloxane. Other or additional types of silicone that can be used in the protectant composition of the present invention are disclosed in U.S. Pat. Nos. 6,221,433 and 7,738,383, which are fully incorporated herein by reference. Generally, the viscosity of the silicone used in the protectant composition is about 10-1000 cSt (25° C.) (ASTM D-4283), typically about 100-500 cSt (25° C.), more typically about 200-400 cSt (25° C.), and still more typically about 200-350 cSt (25° C.). One specific silicone that can be used is Si 350 cSt, a silicone oil available from Dow Corning.

The silicone content of the protectant composition of the present invention is generally no more than about 20 weight percent, typically less than about 12 weight percent, and more typically less than about 10 weight percent. The silicone content of the protectant composition of the present invention is also generally at least about 0.5 weight percent. Heretofore, high gloss and shine has been very difficult to achieve from silicone based protectant composition when the silicone content was less than about 20 weight percent, and even more particularly less than about 10 weight percent. The present invention contemplates various ranges of silicone that can be successfully and economically used in the protectant composition of the present invention. For example, the silicone content in various protectant compositions of the present invention can be about 0.5-15 weight percent, about 1-15 weight percent, about 1-10 weight percent, about 1.5-9.5 weight percent, about 1.5-9 weight percent, about 2-9 weight percent, about 2-7 weight percent, and about 2.5-6.5 weight percent.

The term "mineral oil" has been previously defined above. Generally, the viscosity of the mineral oil used in the protectant composition is about 4-1000 cSt (40° C.) (ASTM D-445), typically about 5-500 cSt (40° C.) (ASTM D-445), typically about 10-250 cSt (40° C.), more typically about 20-200 cSt (40° C.), still more typically about 50-150 cSt (40° C.), and yet more typically about 70-130 cSt (40° C.). One specific mineral oil that can be used is Semtol 400 and Semtol 500 commercially available from Sonneborn. Mineral oil is a preferable component for use in the protectant composition due to the clear color, the lack of a scent and the relatively inexpensive cost of the product. However, it can be appreciated that the mineral oil can be partially or fully substituted by one or more other organic solvents that have similar properties as that of mineral oil (e.g., clear and/or substantially odorless; disperses silicone, etc.) and which also has a viscosity that falls within the ranges set forth above for mineral oil. As can be appreciated, one or more types of mineral oil can be included in the protectant composition.

The organic solvent in the protectant composition is used as a dispersant for the silicone so as to enable the silicone to better penetrate into, spread over and/or fill into the various surfaces of a substrate to which the protectant composition is applied. As such, the organic solvent facilitates in silicone delivery to a substrate surface. Surprisingly, it has been found that by maintaining a certain weight percent ratio of silicon and organic solvent in the protectant composition, a high gloss and shine can be formed on a protectant surface with a significant reduction in the amount of silicone in the protectant composition. The organic solvent has also been found to facilitate in the cleaning of a substrate surface which appears to assist in obtaining a high gloss and shine after the protectant composition has been applied to a substrate surface. The organic solvent is also believed to improve the spreadability of the protectant composition over a variety of substrate surfaces and to reduce streaking of the protectant composition on a substrate surface.

The organic solvent content of the protectant composition of the present invention is generally less than about 30 weight percent, typically less than about 20 weight percent, more typically less than about 15 weight percent, and still even more typically less than about 10 weight percent. The organic solvent content of the protectant composition of the present invention is also generally at least about 0.1 weight percent, and typically at least about 0.4 weight percent. For example, the organic solvent content in various protectant compositions of the present invention can be about 0.4-16 weight percent, about 0.5-15 weight percent, about 1-12 weight percent, about 1-10 weight percent, about 1-9.5 weight percent, about 1.5-9 weight percent, about 2-9 weight percent, about 2-7 weight percent, and about 2.5-6.5 weight percent.

The weight percent ratio of silicone to organic solvent in the protectant composition is important to achieve the desired gloss and shine properties of the protectant composition. Generally the weight percent ratio of silicone to organic solvent in the protectant composition is greater than about 0.5:1 and generally no more than about 3:1. For example, the weight percent ratio of silicone to organic solvent in the protectant composition can be about 0.5-2.75:1, about 0.5-2.5:1, about 0.5-2:1, about 0.5-1.75:1, about 0.5-1.5:1, about 0.75-1.25:1, about 1-1.25:1, and about 1:1.

The silicone in the protectant composition generally does not form an emulsion with the organic solvent or any other component of the protectant composition. This feature of the protectant composition further distinguishes the protectant composition from prior art protectants. Many of the prior art protectants were formulated as silicone emulsions so as to form a shelf stable product and to achieve the desire performance of the product. Contrary to these past formulations that included surfactant in sufficient quantities to form an emulsion, the protectant composition of the present invention is not a silicon emulsion that is formed from a surfactant, yet the novel composition of the protectant composition has comparable shelf stability as compared to silicon emulsion protectant formulations. The protectant composition can optionally include surfactant; however, when surfactant is included in the protectant composition, the amount of the surfactant is generally included in small amounts. Because the protectant composition of the present invention is not a traditional emulsion that is formed by the addition of significant quantities of surfactant, it has been found that the silicone in the protectant composition can quickly release from the organic solvent and other components of the protectant composition so as to rapidly adhere to the surface of a substrate. This feature of the protectant composition is believed to facilitate in forming a high gloss and shine on the surface of the substrate.

The protectant composition contains an inorganic solvent as the principal component of the protectant composition. The inorganic solvent is generally water (e.g., de-ionized water, distilled water, etc.). The inorganic solvent content of the protectant composition is generally over 50 weight percent and less than about 99 weight percent, typically about 55-98 weight percent, more typically about 60-98 weight percent, still more typically about 75-97 weight percent, even more typically about 75-95 weight percent.

The protectant composition includes one or more rheology modifiers. The rheology modifier facilitates in forming a protectant composition that 1) can be properly dispensed (e.g., dispensed from a sprayer, dispensed as an aerosol, poured from a container, etc.), 2) has the desirable cling properties after being sprayed or otherwise applied onto the substrate surface, 3) forms the desired gloss and shine properties on a substrate surface, 4) maintains the mixture of organic solvent (e.g., mineral oil, natural oil) and inorganic solvent (e.g., water) for longer periods of time so as to increase the stability and shelf life of the protectant composition, and/or 5) has the desired thickness and viscosity. Various types of rheology modifiers can be included in the protectant composition. Non-limiting examples of acceptable rheology modifiers include various soluble polyacrylic acid and/or polyacrylic acid/polyacrylate copolymers, e.g., those available under the trade names Pemulen (e.g., Pemulen 1621, 1622, TR-1, Tr-1) commercially available from Lubrizol; Carbopol (e.g., Carbopol 64, 676, EDT 2623, EDT 2691, EZ-2, EZ-3, EZ-4, Aqua 30, Aqua SF-1, Ultrez 20, Ultrez 21) and Acusol (e.g., Acusol 805S, 810A, 820, 823, 830); various acrylate/acrylamide copolymers (e.g., Novemer EC-1); various polyacryl-amides; associative polyethers such as polyoxyethylene and polyoxyethylene/polyoxypropylene copolymer polyethers capped with $C8-30\alpha$-olefin oxides; various vegetable gums (e.g., gum tragacanth, gum acacia, gum arabic, carageenan gum, xanthan gum, and the like); various cellulose ethers (e.g., carboxymethyl cellulose, hydroxypropyl cellulose, and like).

The content of the rheology modifier in the protectant composition is generally at least about 0.01 weight percent and no more than about 3 weigh percent, typically about 0.02-2 weight percent, more typically about 0.05-1 weight percent, still more typically about 0.1-0.75 weight percent, and yet even more typically about 0.1-0.5 weight percent. In one non-limiting formulation of the protectant composition, the protectant formulation has a viscosity to enable the protectant composition to be sprayed. In such a formulation, the protectant composition has a viscosity of about 100-20,000 cSt (25° C.), typically about 250-10,000 cSt (25° C.), more typically about 500-5,000 cSt (25° C.), still more typically about 1000-4000 cSt (25° C.), yet more typically about 1200-3200 cSt (25° C.), still yet more typically about 1400-3000 cSt (25° C.), and even more typically about 1600-2800 cSt (25° C.).

The protectant composition can include one or more optional adjuncts, such as one or more rheology modifying agents, builders, buffering agents, pH adjusting agents, opacifiers, surfactant, secondary organic solvents, cleaning agents, cleaning aids, protective agents, chelators, cosolvents, cosurfactants, descalers, foam boosters, foam suppressants, surface modification agents, wetting agents, stain and soil repellents, waxes, resins, polishes, abrasives, colloid stabilizers, waxes, lubricants, odor control agents, perfumes, fragrances and fragrance release agents, brighteners, fluorescent whitening agents, ultraviolet light (UV) absorbers, UV scatterers, excited state quenchers, anti-oxidants, oxygen quenchers, bleaching agents, electrolytes, dyes and/or colorants, phase stabilizers, emulsifiers, defoamers, hydrotropes, cloud point modifiers, antimicrobial agents, preservatives, biocides, and mixtures thereof. These optional one or more adjuncts may be employed in embodiments of the protectant composition to provide further cleaning and protective benefits or functionality to the protectant composition. When employed, each of these one or more optional adjuncts may individually comprise 0.0001-5 weight percent of the protectant composition, typically about 0.001-2 weight percent, more typically about 0.01-1 weight percent.

The inventive protectant composition generally does not include wax. The desired shine and gloss of the protectant composition can be obtained from the novel combination and amounts of silicone and organic solvent in the protectant composition.

The inventive protectant composition generally does not include wax. Shelf stability of the protectant composition is achievable without the addition of surfactant. It has also been found that by reducing the surfactant content of the protectant composition the amount of silicone and the rate at which the silicone transfers to a substrate surface increases.

The inventive protectant composition may optionally include one or more rheology modifying agents. The rheology modifying agent is generally formulated to work with the one or more rheology modifiers in the protectant composition to obtain the desired thickness and/or viscosity of the protectant composition. The rheology modifying agent is generally used to 1) maintain or enhance the properties of the rheology modifier, 2) maintain the stability and shelf life of the protectant composition, and/or 3) maintain the pH of the protectant composition. The rheology modifying agent may also a) improve the cleaning efficiency of the protectant composition and/or b) function as a water softener and/or a sequestering agent; however, this is not required. For example, the rheology modifying agent can be formulated to buffer or neutralize the one or more rheology modifiers and/or one or more by-products of the one or more rheology modifiers so as to better enable the one or more rheology modifiers to function and/or to assist in the mixing together of the silicone and organic solvent (e.g., mineral oil, natural oil etc.); however, the one or more rheology modifying agents, when used, can have other or additional functions in the protectant composition. One type of rheology modifying agent that can be used is a compound that assists in the mixing of the organic solvent and silicone in the protectant composition. One non-limiting rheology modifying agent of this type is triethanolamine. When rheology modifying agent is included in the protectant composition, the content of the rheology modifying agent is about 0.01-4 weight percent of the protectant composition, typically about 0.04-3 weight percent, more typically about 0.05-2 weight percent, still more typically about 0.1-1 weight percent, and yet more typically about 0.1-0.5 weight percent.

The inventive protectant composition may optionally include one or more buffer and/or pH adjusting agents. The buffering agents and/or pH adjusting agents may be used alone, or in mixtures, or in combination with or in the form of their appropriate conjugate acids and/or conjugate bases, for adjusting and controlling the pH of the inventive compositions. A variety of buffering and/or pH adjusting agents can be optionally used in the protectant composition. The pH of the protectant composition is generally about 6-8 pH, typically about 7-8 pH, and more typically about 7.1-7.9 pH; however, the protectant composition can have other pH values. Such buffering and/or pH adjusting agents, when used, can include, but are not limited to, organic acids, mineral acids, amino acids, lower alcohol amines, alkali metal and alkaline earth salts of silicate, metasilicate, polysilicate, borate, hydroxide, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2-methyl-propanol. Some non-limiting specific examples include amino acids such as lysine; lower alcohol amines like monoalkanolamine, dialkanolamine and trialkanolamine; alkanolamines that include the mono-, di-, and tri-ethanolamines; tri(hydroxymethyl)amino methane (TRIS); 2-amino-2-ethyl-1,3-propanediol; 2-amino-2-methyl-propanol; 2-amino-2-methyl-1,3-propanol; disodium glutamate; N-methyl diethanolamide; 2-dimethylamino-2-methylpropanol (DMAMP); 1,3-bis(methylamine)-cyclohexane; 1,3-diamino-propanol N,N'-tetra-methyl-1,3-diamino-2-propanol; N,N-bis(2-hydroxyethyl)glycine (bicine); N-tris (hydroxymethyl)methyl glycine (tricine); ammonium carbamate; citric acid; acetic acid; ammonia; alkali metal carbonates (e.g., sodium carbonate, sodium bicarbonate, etc.); alkali metal phosphates (e.g., sodium polyphosphate, etc.); sodium and/or potassium hydroxide. Additional buffering and/or pH adjusting agent that can also or alternatively be used are disclosed in WO 95/07971, which is fully incorporated herein by reference.

When one or more buffering and/or pH adjusting agents are included in the protectant composition, the amount of buffering and/or pH adjusting agent is at least about 0.001 weight percent and less than about 0.8 weight percent, typically about 0.04-0.3 weight percent, more typically about 0.04-0.2 weight percent, still more typically about 0.05-0.15 weight percent, and yet even more typically about 0.05-0.1 weight percent.

The inventive protectant composition may optionally include one or more preservatives and/or biocides. Many different types of preservatives and/or biocides can be used in the protectant composition. Furthermore, one or more preservatives and/or biocides can be used in the protectant composition. Non-limiting of examples of preservatives that can be used in the protectant composition include, but are not limited to, mildewstat or bacteriostat, methyl, ethyl and propyl parabens, short chain organic acids (e.g. acetic, lactic and/or glycolic acids), bisguanidine compounds (e.g., Dantogard and/or Glydant) and/or short chain alcohols (e.g. ethanol and/or IPA). Non-limiting examples of mildewstat or bacteriostat include, but are not limited to, mildewstats (including non-isothiazolinones compounds) including Proxel GXL and Vantocil IB, from Avecia Corporation, Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, and Neolone M-10, all available from Rohm and Haas Company; BRONOPOL, a 2-bromo-2-nitropropane 1, 3 diol, from Boots Company Ltd., PROXEL CRL, a propyl-p-hydroxybenzoate, from ICI PLC; NIPASOL M, an o-phenylphenol, sodium salt, from Nipa Laboratories Ltd., DOWICIDE A, a 1,2-Benzoisothiazolin-3-one, Dowacil 75, and Bioban, all from Dow Chemical Co., and IRGASAN DP 200, a 2,4,4'-trichloro-2-hydroxydiphenylether, from Ciba-Geigy A.G, and Surcide P from Surety Laboratories, Dantogard Plus (e.g., 1,3-Bis(hydroxymethyl)-5,5-dimethylhydantoin and hydroxymethyl-5,5-dimethylhydantoin) commercially available from Lonza, Bioban DXN (e.g., dimethoxane) commercially available from Angus, etc. Non-limiting examples of biocides include quaternary ammonium compounds and phenolics. Non-limiting examples of these quaternary compounds include benzalkonium chlorides and/or substituted benzalkonium chlorides, di($C_6$-$C_{14}$)alkyl di short chain ($C_{1-4}$ alkyl and/or hydroxyalkl) quaternary ammonium salts, N-(3- chloroallyl) hexaminium chlorides, benzethonium chloride, methylbenzethonium chloride, and cetylpyridinium chloride. Other quaternary compounds include the group consisting of dialkyldimethyl ammonium chlorides, alkyl dimethylbenzylammonium chlorides, dialkylmethylbenzylammonium chlorides, and mixtures thereof, wherein the alkyl radicals may be C1 to C24. Biguanide antimicrobial actives include, but not limited to, polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are also in this class. When one or more preservatives and/or biocides are included in the protectant composition, the amount of preservative and/or biocide is at least about 0.001 weight percent and less than about 1 weight percent, typically about 0.04-0.8 weight percent, more typically about 0.04-0.6 weight percent, still more typically about 0.05-0.5 weight percent, and yet even more typically about 0.05-0.3 weight percent.

The inventive protectant composition may optionally include one or more opacifiers. The opacifier is used to make the protectant composition opaque so that it can be more easily seen on the surface of a substrate. One or more opacifiers can optionally be included in the protectant composition. Non-limiting examples of opacifiers that can be used include Acusol OP302b (e.g., styrene/acrylic copolymers) commercially available from Rohm & Haas. The opacifier, when used, has a content in the protectant composition of about 0.001-3 weight percent, typically about 0.04-2 weight percent, more typically about 0.05-1 weight percent, still more typically about 0.1-1 weight percent, and yet even more typically about 0.2-0.8 weight percent. When used, the protectant composition can include one or more opacifiers.

A variety of builders can be optionally used in the protectant composition. Non-limiting examples of builders that can be used include phosphate-silicate compounds, zeolites, alkali metal, ammonium and substituted ammonium polyacetates, trialkali salts of nitrilotriacetic acid, carboxylates, polycarboxylates, carbonates, bicarbonates, polyphosphates, aminopolycarboxylates, polyhydroxysulfonates, and starch derivatives. The builders can also or alternatively include polyacetates and polycarboxylates. The polyacetate and polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, and citric acid. These builders can also exist either partially or totally in the hydrogen ion form. The builder agent can include sodium and/or potassium salts of EDTA and substituted ammonium salts. The substituted ammonium salts include, but are not limited to, ammonium salts of methylamine, dimethylamine, butylamine, butylenediamine, propylamine, triethylamine, trimethylamine, monoethanolamine, diethanolamine, triethanolamine, isopropanolamine, ethylenediamine tetraacetic acid and propanolamine.

When included in the protectant composition, the builder comprises at least about 0.01 weight percent and up to about 4 weight percent of the protectant composition, typically about 0.04-3 weight percent, more typically about 0.1-2 weight percent, still more typically about 0.15-1 weight percent, and yet even more typically about 0.2-0.5 weight percent.

The protectant composition can optionally include a secondary organic solvent other than mineral oil or organic solvent similar to mineral oil; however, this is not required. Non-limiting examples of secondary organic solvents that can optionally be included in the protectant composition include, but are not limited to monohydric alcohols and polyhydric alcohols, such as for example $C_{1-6}$ alkanols and $C_{1-6}$ diols, alkylene glycols, such as for example $C_{1-10}$ alkyl ethers of alkylene glycols, glycol ethers, such as for example $C_{3-24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. The secondary organic solvents, when used, have content in the protectant composition of about 0.001-5 weight percent. When used, the protectant composition can include one or more secondary organic solvents.

The protectant composition can optionally include one or more wetting agents. Non-limiting examples of wetting agents include silicone wetting agents which can aid in the spreading and leveling of the protectant composition on a substrate surface. Non-limiting examples of wetting agents include, but are not limited to, polyalkyleneoxide modified polydimethylsiloxane, available from General Electric as Silwet 7650, polyalkyleneoxide modified heptamethyltrisiloxane, also available from General Electric as Silwet 7280 and Silwet 7608, silicone glycol copolymer surfactant, available from Dow Corning as DC 57 and the Dow Corning silicone polyether surfactant designated Q2-5211. Additional examples also include materials with additional leveling properties, such as for example, but not limited to alkyl methyl siloxanes DC 56 available from Dow Corning and organomodified dimethylsiloxane available from General Electric designated as Formasil 433. The wetting agents, when used, have content in the protectant composition of about 0.001-5 weight percent. When used, the protectant composition can include one or more wetting agents.

The protectant composition can optionally include one or more fragrances. Non-limiting examples of perfumes are disclosed in U.S. Pat. Nos. 4,145,184, 4,209,417, 4,515,705, and 4,152,272, all of which are fully incorporated herein by reference. The fragrance, when used, comprises about 0.0001 weight percent to about 10 weight percent, typically about 0.001 weight percent to about 5 weight percent, and more typically about 0.01 weight percent to about 1 weight percent of the inventive protectant composition.

The protectant composition can optionally include one or more propellants. The protectant composition of the present invention can be in the form of an aerosol, particularly in a pressurized aerosol container employing a compressed gas or fluid to serve as a propellant system; however, this is not required. Suitable propellants included compressible gases, including but not limited to air, nitrogen, argon, helium, carbon dioxide, nitrous oxide, and mixtures thereof. Suitable propellants include those standard aerosols known in the art as "LPG" or "liquid petroleum gas" propellants. Non-limiting examples include, but are not limited to, those commonly designated as LPG A-46, LPG A-70, LPG A-108 and their mixtures and combinations with other aerosols. LPG consists of high purity hydrocarbons derived directly from oil wells, and as a by-product from the petroleum industry, consisting essentially of a mixture of propane, isobutane and n-butane. Other common volatile organic compounds and their derivatives may suitably be employed, including dialkyl ethers, such as dimethyl ether and diethyl ether and the petroleum ethers. Volatile organic compounds may also be suitably employed as propellants, include the alkane series from methane, propane, butane, pentane and hexane and all of their respective isomers, and mixtures thereof, alone and in combinations thereof. Propellants offering improved safety in terms of reduced or non-flammability are also suitable, and include such liquid propellants as those based on chlorofluorocarbons, even though it is realized that the chlorofluorocarbons are no longer generally used due to environmental considerations. Suitable alternatives, believed to be less harmful to the earth's environment and ozone layer, include non-halogenated and partially halogenated materials, such as hydrofluorocarbons (HFC), hydrofluoroalkanes (HFA) and hydrochloroalkanes (HCA) and hydrochlorofluorocarbons (HCFC). Some non-limiting examples include, but are not limited to HFC-125, HFC-134a, HFC-152a, HFC-227ea, HFC-245fa and HCFC-22. Also suitable are aerosol propellants approved by SNAP, under the United States Environmental Protection Agency (US-EPA) Significant New Alternatives Policy (detailed in Section 612 of the Clean Air Act), which includes oxygenated organic solvents (esters, ethers, alcohols) chlorinated solvents (trichloroethylene, perchloroethylene, methylene chloride), trans-1,2-dichloroethylene, hydrofluoroether (HFE) 7100 and HFE 7200, monochlorotoluenes and benzotrifluorides, (subject to a 50 ppm workplace standard for monochlorotoluenes and a 100 ppm standard for benzotrifluoride), HFC-4310mee (subject to a 200 ppm time-weighted average workplace exposure standard and 400 ppm workplace exposure ceiling HFC-365mfc), HCFC-225ca/cb, perfluorocarbons (PFCs) and perfluoropolyethers (PFPEs) (subject to need with no reasonable alternatives found sufficient for intended end use applications), HCFC-141b, terpenes, C5-C20 petroleum hydrocarbons, and HFC-245fa. When an aerosol formulation is employed, one or more corrosion inhibitors known in the art are generally included in the formulations to protect metal portions of the pressurized system, including the can, valve, valve spring, nozzle and components of the aerosol package and dispenser assembly. In suitable embodiments, the propellant comprises 1 weight percent to about 90 weight percent, typically 2 weight percent to about 80 weight percent, and more typically 5 weight percent to about 70 weight percent of the inventive protectant composition.

Method of Use

The protectant composition of the present invention has a number of applications such as, but not limited to, automotive care applications, home care applications, personal care applications, industrial and institutional applications, pharmaceutical applications, textile applications, and the like. The protectant composition can be used for treating a host of inanimate surfaces including, but not limited to, hard and soft surfaces found throughout the interior and exterior of the household and automotive areas. Household surfaces on which the protectant composition can be used include, but are not limited to, floors, counter tops, furniture, walls and surfaces constructed of glass, plastic, fiberglass, laminates, such as Formica™ and Corian™, tile, porcelain, brick, concrete, limestone, grout, marble, granite as well as metallic surfaces such as aluminum, steel, stainless steel, iron, chrome, copper, brass and the like. Other household surfaces include carpet, upholstery, vinyl, leather, textiles, fabric, floors, walls, ceilings and wall finishes, such as wall paper, painted surfaces and panels. Automotive surfaces on which the protectant composition may be used include tires, rubber, vinyl, fabric, plastic and general elastomer surfaces found on the exterior and interior of a boat, vehicle, automobile, bus, car, plane, motorcycle and the like.

Method of Application

The protectant composition of the present invention may be applied to the target surface by a variety of means, including direct application by means of a spray, pump or aerosol dispensing means, or by other means, including the use of a carrier, or dilution system, as for example, but not limited to a wash, dip or immersion process. Regarding applications by use of a carrier, such suitable carriers include, for example, an impregnated wipe, foam, sponge, cloth, towel, tissue or paper towel or similar releasably absorbent carrier that enables the inventive compositions to be applied by direct physical contact and transferred from the carrier to the target surface, generally during a spreading, padding, rubbing or wiping operation. Combinations of a direct application, followed by a spreading, padding, rubbing or wiping operation performed with the aid of a foam, sponge, cloth, towel, tissue or paper towel, squeegee or similar wiping implement is also suitable for applying the protectant compositions of the present invention.

The protectant composition may be also be sprayed directly onto the target surface and therefore are typically packaged in a spray dispenser. The spray dispenser can be any of the manually activated means for producing a spray of liquid droplets as is known in the art, e.g., trigger-type, pump-type, electrical spray, hydraulic nozzle, sonic nebulizer, high pressure fog nozzle, non-aerosol self-pressurized, and aerosol-type spray means. Automatic activated means can also be used herein. These types of automatic means are similar to manually activated means with the exception that the propellant is replaced by a compressor. The spray dispenser can be an aerosol dispenser. Said aerosol dispenser comprises a container which can be constructed of any of the conventional materials employed in fabricating aerosol containers. A more complete description of commercially available aerosol-spray dispensers appears in U.S. Pat. Nos. 3,436,772 and 3,600,325, both of which are fully incorporated herein by reference. Alternatively, the spray dispenser can be a self-pressurized non-aerosol container having a convoluted liner and an elastomeric sleeve. A more complete description of self-pressurized spray dispensers can be found in U.S. Pat. Nos. 4,260,110; 5,111,971 and 5,232,126, both of which are fully incorporated herein by reference. The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. Other materials can include stainless steel. A more complete disclosure of commercially available dispensing devices appears in: U.S. Pat. Nos. 4,082,223; 4,161,288; 4,274,560; 4,434,917; 4,735,347; 4,819,835; 4,895,279; and 5,303,867; all of which are fully incorporated herein by reference.

Formulation Examples

Several non-limiting formulations of the protectant composition are set forth below:

Protectant Composition Formulations
(Weight Percent)

| Ingredient | Ex. 1 | Ex. 2 | Ex. 3 | Ex. 4 | Ex. 5 | Ex. 6 |
|---|---|---|---|---|---|---|
| Silicone | 0.5-20% | 1-12% | 1-9.5% | 2-8% | 2-4% | 3-6% |
| Organic Solvent | 0.5-30% | 1-12% | 1-9.5% | 2-8% | 2-4% | 3-6% |
| Rheology Modifier | 0.02-3% | 0.04-2% | 0.05-1.5% | 0.1-1.5% | 0.1-1% | 0.2-1% |
| Water | over 50% | over 60% | over 65% | over 70% | over 75% | over 75% |

| Ingredient | Ex. 7 | Ex. 8 | Ex. 9 | Ex. 10 | Ex. 11 | Ex. 12 |
|---|---|---|---|---|---|---|
| Silicone | 1-11% | 2-9.9% | 2.5-9% | 2.6-8.5% | 2.8-4.5% | 3.2-4.2% |
| Organic Solvent | 0.5-12% | 1-11% | 2-10% | 3-8.5% | 3-4% | 2.8-4% |
| Rheology Modifier | 0.0-32% | 0.05-1.8% | 0.08-1.4% | 0.1-1.2% | 0.1-0.8% | 0.15-60% |
| Water | over 60% | over 66% | over 68% | over 72% | over 78% | over 82% |

In the formulations of Examples 1-6, the ratio of the silicone to the organic solvent is 0.5-3:1. The pH of the compositions is 7-8 pH. The viscosity of the compositions is 1500-3500 cSt (25° C.). In the formulations of Examples 7-12, the ratio of the silicone to the organic solvent is 0.8-1.2:1. The organic solvent in Examples 1-12 includes about 75-100 weight percent mineral oil. The pH of the compositions was 7.1-7.8 pH. The viscosity of the compositions was 1700-2100 cSt (25° C.). The formulations of Examples 1-12 are designed to be dispensed onto a substrate by a pump sprayer. The gloss unit range for the formulations of Examples 1-12 is 2-18.

Several non-limiting specific formations for the protectant composition in accordance with the present invention are as follows:

| Ingredient | Ex. 13 | Ex. 14 | Ex. 15 | Ex. 16 | Ex. 17 | Ex. 18 |
|---|---|---|---|---|---|---|
| Silicone | 0.6-16% | 8-12% | 3-5% | 1.1-2.9% | 4.2-6.1% | 7.2-9.9% |
| Organic Solvent | 0.6-16% | 8-12% | 3-5% | 1.1-2.9% | 4.2-6.1% | 7.2-9.9% |
| Rheology Modifier | 0.03-2% | 0.02-1% | 0.04-0.4% | 0.02-0.3% | 0.05-1.5% | 0.04-0.6% |
| Rheology Modifying Agent | 0-3% | 0.01-1.5% | 0.05-0.6% | 0.03-0.4% | 0-0.35% | 0-0.5% |
| Buffering and/or pH Adjusting Agent | 0.001-0.3% | 0.01-0.6% | 0.02-0.3% | 0.01-0.18% | 0.02-0.16% | 0.01-0.22% |
| Biocide or Preservative | 0-0.5% | 0.001-0.4% | 0.03-0.4% | 0.01-0.35% | 0.02-0.38% | 0.04-0.55% |
| Surfactant | 0-0.4% | 0-0.2% | 0-0.1% | 0-0.1% | 0-0.15% | 0-0.44% |
| Opacifier | 0-1% | 0.05-0.9% | 0.1-0.8% | 0.1-0.8% | 0.08-0.7% | 0.02-0.9% |
| Fragrance | 0-0.8% | 0-0.6% | 0-0.3 | 0-0.3% | 0-0.35% | 0-0.4% |
| Water | over 60% | over 68% | over 80% | over 85% | over 82% | over 72% |
| Silicone/Organic Solvent Weight Ratio | 0.5-3:1 | 0.6-1.6:1 | 0.7-1.4:1 | 0.8-1.3:1 | 0.6-1.5:1 | 0.7-1.3:1 |
| Gloss Unit | 2-18 | 11-17 | 5-11 | 3-8 | 6-12 | 10-15 |

| Ingredient | Ex. 18 | Ex. 19 | Ex. 20 | Ex. 21 | Ex. 22 | Ex. 23 |
|---|---|---|---|---|---|---|
| Silicone | 7.2-9.9% | 0.55-16% | 1.1-9.9% | 1-11% | 0.51-12% | 0.8-11% |
| Organic Solvent | 7.2-9.9% | 0.55-16% | 1.1-9.9% | 1-11% | 0.4-12% | 0.8-11% |
| Rheology Modifier | 0.04-0.6% | 0.01-2% | 0.04-0.6% | 0.1-1.5% | 0.05-1.2% | 0.02-0.8% |
| Rheology Modifying Agent | 0-0.5% | 0-3% | 0-0.5% | 0-1% | 0-1.1% | 0.01-3% |
| Buffering and/or pH Adjusting Agent | 0.01-0.22% | 0.01-0.3% | 0.01-0.22% | 0.01-0.2% | 0.01-0.3% | 0.001-0.4% |
| Biocide or Preservative | 0.04-0.55% | 0-0.5% | 0.01-0.55% | 0-0.5% | 0-0.6% | 0.01-0.6% |
| Surfactant | 0-0.44% | 0-0.4% | 0-0.44% | 0-0.1% | 0-0.5% | 0-0.1% |

-continued

| | | | | | | |
|---|---|---|---|---|---|---|
| Opacifier | 0.02-0.9% | 0-1% | 0.02-0.9% | 0-0.9% | 0-0.8% | 0.01-0.7% |
| Fragrance | 0-0.44% | 0-0.8% | 0-0.44% | 0-0.4% | 0-0.55% | 0-0.4% |
| Water | over 72% | at least 60% | at least 75% | over 72% | at least 73% | over 72% |
| Silicone/ Organic Solvent Weight Ratio | 0.7-1.3:1 | 0.5-3:1 | 0.7-1.3:1 | 0.7-1.4:1 | 0.6-2:1 | 0.7501.8:1 |
| Gloss Unit | 10-15 | 2-18 | 3-16 | 3-16 | 3-17 | 3-16 |

In the formulations of Examples 13-23 pH of the compositions is 7.1-7.8 pH. The organic solvent in Examples 13-22 includes about 85-100 weight percent mineral oil. The viscosity of the compositions is 1600-3100 cSt (25° C.). The formulations of Examples 13-23 are designed to be dispensed onto a substrate by a pump sprayer.

| Ingredient | Ex. 24 | Ex. 25 | Ex. 26 | Ex. 27 | Ex. 28 | Ex. 29 | Ex. 30 | Ex. 31 |
|---|---|---|---|---|---|---|---|---|
| Si 350 cSt | 3.9-4.6% | 8.5-11.5% | 1.4-2.5% | 4.7-5.5% | 5.1% | 2% | 10.5% | 4.3% |
| Semtol 500 | 3.8-4.8% | 8-12% | 1.2-3% | 4.2-6% | 5.1% | 2% | 10.5% | 4.3% |
| Pemulen 1621 | 0.1-0.25% | 0.09-0.22% | 0.06-.21% | 0 | 0 | 0.16% | 0.16% | 0.19% |
| Novemer EC-1 | 0 | 0 | 0 | 0.6-1.8% | 1% | 0 | 0 | 0 |
| TEA 100% | 0.1-0.4% | 0.12-0.35% | 0.13-.28% | 0 | 0 | 0.21% | 0.21% | 0.25% |
| NaHCO$_3$ | 0.02-0.2% | 0.02-0.18% | 0.03-.13% | 0.02-.15% | 0.07% | 0.07% | 0.07% | 0.07% |
| Dantogard Plus | 0.1-0.4% | 0.1-0.4% | 0.08-0.3% | 0.07-.35% | 0.2% | 0.2% | 0.2% | 0.2% |
| Bioban DXN | 0.01-0.15% | 0.01-0.15% | 0.02-.13% | 0.01-.15% | 0.06% | 0.06% | 0.06% | 0.06% |
| Acusol OP302b | 0.2-0.8% | 0.2-0.6% | 0.15-.75% | 0.05-0.4% | 0.2% | 0.6% | 0.6% | 0.6% |
| Water (DI) | 86-91.5% | 72-81% | 91-97% | 82-92% | 88.27% | 94.7% | 77.7% | 90.03% |
| Silicone/Mineral Oil Weight Ratio | 0.5-1.8:1 | 0.65-1.4:1 | 0.55-1.2:1 | 0.6-1.7:1 | 0.95-1.05:1 | 0.95-1.05:1 | 0.95-1.05:1 | 0.95-1.05:1 |
| Gloss Unit | 6-10 | 12-16 | 2-7 | 6-11 | 8-10 | 3-6 | 13-15 | 7-9 |
| Viscosity | 1850-2200 | 1650-1850 | 1625-1875 | 1800-2200 | 1962 | 1740 | 1752 | 2094 |
| pH | 7.3-7.7 | 7.2-7.7 | 7.2-7.8 | 7.2-7.9 | 7.6 | 7.53 | 7.53 | 7.57 |

Si 350 cSt is a silicone oil of 350 cps at 25° C. available from Dow Corning.

Semtol 500 is a mineral oil of 90-125 cSt at 40° C. available from Sonneborn.

Pemulen 1621 is a rheology modifier formed of soluble polyacrylic acid and/or polyacrylic acid/polyacrylate copolymers that is available from Lubrizol.

Novemer EC-1 is a rheology modifier formed of acrylate/acrylamide copolymers that is available from Lubrizol.

TEA 100% is triethanolamine that is available from Huntsman. TEA 100% functions as a rheology modifying agent.

Dantogard Plus is a preservative formed of 1,3-Bis(hydroxymethyl)-5,5-dimethylhydantoin and hydroxymethyl-5,5-dimethylhydantoin that is available from Lonza.

Bioban DXN is a biocide formed of dimethoxane available from Angus.

Acusol OP302b is an opacifier formed of styrene/acrylic copolymers that is available from Rohm & Haas.

The water is generally deionized water.

The viscosity is measured in centipoise (cps) at 25° C. using an LV V iscometer equipped with spindle #3 operating at 20 rpm.

The gloss unit was measured by a BYK-Gardner portable micro-Tri-gloss multi-angle refectometer that conforms to ASTM D523. For each test, the protectant composition was applied to a vinyl surface. Untreated vinyl has a gloss unit value of about 1.8-2.2. The procedure used to measure the gloss unit valves was as follows: 1) calibrate the gloss meter at the start of a series of gloss readings. (Take reading at 85°), 2) orient the reflectometer to minimize the texture effects on the materials sample (i.e. grain parallel to the gloss meter beams)—Always read the materials samples using the same orientation, and 3) measure gloss at 85° from 3 different spots on the materials sample (3"×6"). As illustrated in the above examples, the gloss unit value was increased by use of the protectant composition of the present invention, thereby indicating that a highly gloss finish resulted from the use of the protectant composition.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between.

We claim:

1. A silicone based automotive protectant composition comprising:
   a. at least 0.5 weight percent and up to 10 weight percent silicone;
   b. at least 0.1 weight percent and up to 10 weight percent of an organic solvent comprising oil selected from the group consisting of:

a mineral oil, a natural oil, and combinations or mixtures thereof, wherein said organic solvent includes more than 60 weight percent mineral oil;
   c. from 0.01 to 3 weight percent of a rheology modifier; and
   d. from 60 to 98 weight percent water;
   wherein a weight ratio of said silicone to said organic solvent is 0.5-3:1, wherein said protectant composition is sprayable or pumpable and has a viscosity of 1600-3100 cSt (25° C.), and wherein no surfactant is included in said protectant composition.

2. The protectant composition as defined in claim 1, wherein said weight ratio of said silicone to said organic solvent is over 0.5:1: and up to 2:1.

3. The protectant composition as defined in claim 2, wherein said weight ratio of said silicone to said organic solvent is 0.75-1.5:1.

4. The protectant composition as defined in claim 1, comprising by weight percent:

| | |
|---|---|
| Silicone | 1.1-9.9% |
| Organic Solvent | 1.1-9.9% |
| Rheology Modifier | 0.04-0.6% |
| Rheology Modifying Agent | 0-0.5% |
| Buffering or pH Adjusting Agent | 0.01-0.22% |
| Biocide or Preservative | 0.01-0.55% |
| Surfactant | 0-0.44% |
| Opacifier | 0.02-0.9% |
| Fragrance | 0-0.44% |
| Water | 72-97% | and wherein a silicone to organic solvent weight ratio is 0.7-1.3:1, said organic solvent including at least 75 weight percent mineral oil.

5. The protectant composition as defined in claim 1, comprising by weight percent:

| | |
|---|---|
| Silicone | 1-11% |
| Organic Solvent | 1-11% |
| Rheology Modifier | 0.1-1.5% |
| Rheology Modifying Agent | 0-1% |
| Buffering and/or pH Adjusting Agent | 0.01-0.2% |
| Biocide or Preservative | 0-0.5% |
| Surfactant | 0-0.1% |
| Opacifier | 0-0.9% |
| Fragrance | 0-0.4% |
| Water | 72-97% | and wherein a silicone to organic solvent weight ratio is 0.7-1.4:1, said organic solvent including at least 95 weight percent mineral oil.

6. The protectant composition of claim 1 wherein the composition provides similar or higher gloss, shine, spreadability and/or protection to a substrate surface in comparison to a protectant composition having a weight percent silicone greater than 10 weight percent, and a surfactant present.

7. The protectant composition of claim 1 which protects a substrate surface from heat damage and/or fading to sun exposure.

8. The protectant composition of claim 1 which protects a substrate surface from damaging effects of UV rays, sunlight, heat and moisture.

9. The protectant composition as defined in claim 1, wherein said organic solvent includes more than 90 weight percent mineral oil.

10. The protectant composition as defined in claim 1, further comprising at least one ingredient selected from the group consisting of a rheology modifying agent, buffering or pH adjusting agent, biocide or preservative, opacifier, fragrance, and combinations thereof 11. The protectant composition as defined in claim 10, wherein said at least one ingredient comprises from 0.0001 to 5 weight percent of the protectant composition.

12. A silicone based automotive protectant composition comprising:
   a. over 0.5 weight percent and up to 10 weight percent silicone;
   b. at least 0.1 weight percent and up to 10 weight percent of an organic solvent, said organic solvent comprising at least 80 weight percent mineral oil;
   c. from 0.01 to 3 weight percent of a rheology modifier; and
   d. from 70 to 98 weight percent water;
   wherein a weight ratio of said silicone to said organic solvent is 0.6-2:1, wherein said protectant composition is spra able or pumpable and has a viscosity of 1600-3100 cSt (25° C.), and wherein no surfactant is included in said protectant composition.

13. The protectant composition as defined in claim 12, wherein said weight ratio of said silicone to said organic solvent is 0.75-1.5:1.

14. The protectant composition as defined in claim 12, wherein said organic solvent includes more than 90 weight percent mineral oil.

15. A sprayable silicone based automotive protectant composition comprising:
   a. over 0.8 weight percent and up to 10 weight percent silicone;
   b. at least 0.1 weight percent and up to less than 10 weight percent of an organic solvent, said organic solvent including at least 90 weight percent mineral oil, natural oil or a combination thereof;
   c. from 0.01 to 3 weight percent of a rheology modifier; and
   d. from 70 to 98 weight percent water;
   wherein a weight ratio of said silicone to said organic solvent is 0.75-1.8:1, wherein said protectant composition is sprayable or pumpable and has a viscosity of 1600-3100 cSt (25° C.), and wherein no surfactant is included in said protectant composition.

* * * * *